(12) United States Patent
Ye

(10) Patent No.: US 7,782,336 B2
(45) Date of Patent: *Aug. 24, 2010

(54) SYSTEM AND METHOD FOR COMMUNICATION AMONG EMBEDDED DEVICES USING VISUAL IMAGES

(75) Inventor: Yiming Ye, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 11/739,199

(22) Filed: Apr. 24, 2007

(65) Prior Publication Data

US 2007/0298727 A1    Dec. 27, 2007

Related U.S. Application Data

(63) Continuation of application No. 09/640,284, filed on Aug. 16, 2000, now Pat. No. 7,224,370.

(51) Int. Cl.
G09G 5/02    (2006.01)
(52) U.S. Cl. .................................. 345/589; 345/581
(58) Field of Classification Search .............. 345/589, 345/581
See application file for complete search history.

(56) References Cited

U.S. PATENT DOCUMENTS

| | | | | |
|---|---|---|---|---|
| 3,584,142 A * | 6/1971 | Schoeffler | ................ | 348/14.01 |
| 5,175,617 A * | 12/1992 | Wallace et al. | ......... | 375/240.01 |
| 5,175,775 A * | 12/1992 | Iwaki et al. | ................ | 382/211 |
| 5,204,573 A * | 4/1993 | Bederson et al. | ............ | 310/198 |
| 5,240,207 A * | 8/1993 | Eiband et al. | ............... | 244/190 |
| 5,592,211 A * | 1/1997 | Porter et al. | ................ | 347/260 |
| 5,648,813 A * | 7/1997 | Tanigawa et al. | ............ | 725/139 |
| 5,877,969 A * | 3/1999 | Gerber | ......................... | 705/13 |
| 5,917,462 A * | 6/1999 | Suzuki et al. | ................ | 345/32 |
| 5,935,190 A * | 8/1999 | Davis et al. | ................. | 701/119 |
| 6,118,442 A * | 9/2000 | Tanigawa | ..................... | 715/719 |
| 6,249,252 B1 * | 6/2001 | Dupray | ........................ | 342/450 |
| 6,301,050 B1 * | 10/2001 | DeLeon | ....................... | 359/618 |
| 6,332,139 B1 * | 12/2001 | Kaneko et al. | ................. | 707/6 |
| 6,384,852 B1 * | 5/2002 | Ye et al. | ....................... | 715/867 |
| 6,392,692 B1 * | 5/2002 | Monroe | ...................... | 348/143 |
| 6,400,989 B1 * | 6/2002 | Eckmiller | .................... | 607/54 |
| 6,545,601 B1 * | 4/2003 | Monroe | ...................... | 340/521 |
| 6,717,570 B2 * | 4/2004 | Anthony et al. | ............. | 345/157 |
| 6,829,603 B1 * | 12/2004 | Chai et al. | ...................... | 707/5 |
| 7,158,145 B1 * | 1/2007 | Fannasch et al. | ............. | 345/589 |
| 2001/0018627 A1 * | 8/2001 | Leatherman et al. | ........ | 700/234 |
| 2001/0054691 A1 * | 12/2001 | Park et al. | .................... | 250/309 |
| 2002/0047945 A1 * | 4/2002 | Tanigawa et al. | ............. | 348/734 |
| 2002/0138842 A1 * | 9/2002 | Chong et al. | ................... | 725/87 |
| 2003/0169335 A1 * | 9/2003 | Monroe | ....................... | 348/143 |
| 2003/0221118 A1 * | 11/2003 | Walker | ......................... | 713/193 |
| 2004/0005093 A1 * | 1/2004 | Rhoads | ......................... | 382/232 |

* cited by examiner

*Primary Examiner*—Javid A Amini

(57) ABSTRACT

A system and method for wireless communication among embedded devices using visual images. More specifically, a signal receiving device uses a visual recording device to locate the signal display screen of a signal transmitting device by employing an alternating image detection method. An image decoder embedded in the signal receiving device decodes the signal received by the visual recording device. In addition, a method is employed for automatically controlling the position and orientation of the signal display device and the visual recording device. Advantageously, communication among the embedded devices can be effectuated without the emission of potentially harmful radiation.

7 Claims, 19 Drawing Sheets

SYSTEM AND METHOD FOR COMMUNICATION AMONG EMBEDDED DEVICES USING VISUAL IMAGES

CROSS-REFERENCE TO RELATED APPLICATION

This is a Continuation Application of U.S. application Ser. No. 09/640,284 filed on Aug. 16, 2000, now U.S. Pat. No. 7,224,370 the disclosure of which is herein incorporated by reference in its entirety.

BACKGROUND OF THE INVENTION

1. Technical Field

The present invention relates generally to communications and, more specifically, to a system and method for wireless communications among computers and other pervasive processing devices.

2. Description of the Related Art

As processing devices become less expensive and more compact, the all-purpose desktop computer is giving way to a new generation of embedded or "smart" devices such as video phones, interactive kiosks, and embedded household devices such as intelligent refrigerators, smart TVs, and intelligent dishwashers. Embedded devices are devices embedded with computing capability, making these devices "intelligent".

As embedded devices become more widely used, they need to be able to communicate and exchange information with each other. For example, a video phone must be able to transmit and receive information with other video phones for effective communication.

Communication between computers is typically trough a communication network, in which computers are connected to each other or to peripherals by hard wire. This technique has a number of disadvantages. For example, cable connection interfaces such as parallel printer ports, are limited in the distance they can reliably transfer data. In addition, coaxial cables, which are used for longer distance hard wire communications, require a relatively expensive terminal interface and therefore are not widely used for connecting peripheral devices to computers. Moreover, when computers are hardwired, any movement or change in the physical locations of the computers requires rewiring and reinstallation.

The prior art teaches communication between embedded devices similar to the communication between computers, as well as existing wireless communication techniques. For example, U.S. Pat. No. 5,613,070 discloses, a system for providing improved communication to data and computer communications network using parallel and serial communication buses and master and local routers. Communication through said network includes use of a master system board with a plurality of subsystem boards.

U.S. Pat. No. 5,369,755 discloses a computer communication bus system using multiple content induced transaction overlap (CITO) communication channels having a plurality of data transmission lines and a plurality of transmission nodes connected to the communication bus. Each transmission node has a data source providing multi-bit data to be transmitted on the communication bus, a plurality of data transformers for encoding or transforming the multi-bit data into different multi-bit encoded data formats, and a plurality of CITO transmitters for transmitting the a content induced transaction overlap (CITO) protocol. Using the CITO protocol, the CITO transmitters transmit the same data on each of the transmission lines in a different order.

Another form of communication between embedded devices is wireless communication. Existing wireless technology includes microwave systems, infrared laser systems, or spread spectrum. However, all these approaches have various disadvantages, including health concerns due to radiation emission and interference of signals.

Microwave is the oldest technology for wireless communications. For decades, most major telecommunications companies have used microwave systems within their networks for transmission of telephone communications, data and video. However, this form of wireless communication has significant disadvantages. For example, microwave signals travel in straight lines and do not readily diffract around barriers such as large man-made structures, hills and mountains. Some attenuation occurs when microwave energy passes through trees and frame houses. In addition, exposure to microwaves (a form of radiation) poses a health hazard and can cause nerve, fetal and DNA damage, cataracts, behavioral disturbances, changes to blood chemistry and impaired immune defense.

For example, U.S. Pat. No. 4,933,682 discloses a point to point microwave communication service antenna pattern with anull in an interfering direction that includes a microwave antenna system at each point directed at the other point, the radiation pattern of the antenna system at at least one point has a substantial null in the direction of an antenna of another microwave communication service to avoid an exchange of signals with the other service, the antenna system provided at said one point includes two antenna elements having substantially equal directional radiation patterns, so oriented and spaced apart a distance that is at least several wave length of the operating frequency of the elements so that the radiation patterns of the elements overlap producing a net radiation pattern that results from interference of the patterns and the net pattern has a substantial lobe in the direction of the other point of said service and a substantial null in the direction of an antenna of the other microwave communication service.

Another form of wireless communications is spread spectrum. Spread spectrum uses de-restricted radio frequencies and comes in two forms: direct sequencing and frequency hopping. Direct sequencing involves the use of a constant frequency for direct transmission. However, this form of spread spectrum is subject to problems such as catastrophic interference since it uses a signal whose frequency is constant. Catastrophic interference occurs when another signal is transmitted on, or very near, the frequency of the desired signal. In addition, a constant-frequency signal is easy to intercept, and is therefore not suited to applications in which information must be kept confidential between the transmitting and receiving parties.

Frequency hopping transmissions seek open frequencies and hop from frequency to frequency at split second intervals according to a specific and complicated mathematical function. Although this form of spread spectrum is more secure than direct sequencing, transmissions are secure only if the mathematical function is kept out of the hands of unauthorized people or entities. In addition, radio frequency emission is a type of electromagnetic energy or radiation, and thus is a possible health risk and cause for concern due to radiation exposure.

U.S. Pat. No. 5,854,985 discloses, an adaptive omni-modal radio apparatus and method for describing a frequency and protocol agile wireless communication product, and chipset for forming the same, including a frequency agile transceiver, a digital interface circuit for interconnecting the radio transceiver with external devices, protocol agile operating circuit for operating the radio transceiver in accordance with one of the transmission protocols as determined by a protocol signal and an adaptive control circuit for accessing a selected wireless communication network and for generating the frequency control signal and the protocol control signal in response to a user defined criteria.

U.S. Pat. No. 5,761,621 discloses a network and method of operating a network of wireless service providers adapted to interact with a plurality of omni-modal wireless products within a given geographic area in a manner to permit the wireless service providers to "borrow" radio frequencies from other wireless service providers within the same geographic region.

Another form of wireless communication is the infrared laser communication system, which is used in thousands of installations world-wide for cable-free transmission of data, voice and video at speeds from T-1 through 622 Mbps. These systems can provide a transparent and cost effective connection between buildings at distances up to 6000 meters (3.69). These free-space, optical laser communications systems are wireless connections through the atmosphere communicating via electromagnetic radiation. Infrared laser systems work basically the same as fiber optic cable except the beam is transmitted through open space rather than glass fiber. The systems operate by taking a standard data or telecommunications signal, converting it into a digital format and transmitting it through free space. Two parallel beams are used, one for transmission and one for reception. The carrier used for the transmission of this signal is infrared and is generated by either a high power LED or a laser diode. The disadvantage of this form of wireless communication, however, is the possible health risk due to emission of radiation, especially in enclosed spaces where there are numerous devices communicating with each other via infrared, which have frequencies higher than those of microwaves.

U.S. Pat. No. 5,247,380 discloses an infrared data communications network in which groups of personal computers and associated peripherals may communicate by infrared signals with each other. The system utilizes a error correction and a packet switched protocol which allows any terminal to select communications with any other terminal or terminals without degradation of the error rate. Error free transmission is maintained by means of error correcting encoding and a handshake protocol. The packet switched protocol permits any terminal to function as a store and forward repeater thus making the system less susceptible to beam blockage.

As embedded devices become more commonplace, homes and offices are becoming occupied by greater numbers of various intelligent appliances which need to communicate with each other. Using current wireless communication techniques may be a health hazard because of the high output of emitting rays in relatively small enclosed spaces. In larger amounts, microwave and spread spectrum radio waves in enclosed spaces can interfere with each other. Accordingly, an efficient, accurate and non-emitting wireless communication technique which allows embedded devices to communicate with each other is highly desirable.

SUMMARY OF THE INVENTION

The present invention is directed to a system and method for wireless communication among embedded devices using visual images. In one aspect of the present invention, a communication system is provided comprising a signal transmitting device having a sending CPU and a sending memory; a generated signal template for encoding a signal pattern to be transmitted; a signal display for displaying the signal pattern encoded by said generated signal template; a signal display controller for controlling position and orientation of said signal display; a signal receiving device for communicating with said signal transmitting device having a receiving memory and a receiving CPU; a visual recording device for sensing the signal pattern of the signal display; an image decoder for decoding the signal pattern; and a visual recording device controller for automatically controlling the orientation and zoom of said visual recording device, wherein communication between said signal transmitting device and said signal receiving device is established by the visual recording device detecting and decoding visual images displayed by the signal display. More specifically, a generated signal template embedded in the signal transmitting device encodes visual signal patterns to be transmitted, and an image deocder embedded in the signal receiving device decodes the signal received by the visual recording devices.

In another aspect of the present invention, a method of visual communication between a signal transmitting device and a signal receiving device is provided comprising the steps of adjusting a signal display of said signal transmitting device and a visual recording device of said signal receiving device and using an alternating display process to establish a visual connection between said signal display and said visual recording device; encoding a signal pattern using a generated signal template of said signal transmitting device; visually transmitting the signal pattern through free space from the signal display of said signal transmitting device; receiving an image of the signal pattern using the visual recording device of said signal receiving device; and decoding the signal pattern using an image decoder of the signal receiving device.

In yet another aspect of the present invention, a sending controller automatically controls the position and orientation of the signal display such that the signal display establishes a visual connection with the visual recording device.

In yet another aspect of the present invention, a receiving device controller automatically controls the orientation and zoom of the visual recording device. More specifically, the pan, tilt and zoom of the visual recording device is automatically adjusted to view the signal display of the signal transmitting device.

In yet another aspect of the present invention, the signal receiving device locates the signal display of the signal transmitting device by detecting changing images displayed by the signal display. More specifically, the signal receiving device asks the signal transmitting device to alternate its signal display within a certain period of time. The signal receiving device then locates the signal display by determining the largest area of an alternating image.

An object of the invention is an improved system and method for wireless communication among embedded devices without harmful radiation.

These and other aspects, features and advantages of the present invention will be described or become apparent from the following detailed description of the preferred embodiments, which is to be read in connection with the accompanying drawings.

DETAILED DESCRIPTION OF PREFERRED EMBODIMENTS

It is to be understood that the exemplary system modules and method steps described herein may be implemented in various forms of hardware, software, firmware, special purpose processors, or a combination thereof. Preferably, the present invention is implemented in software as an application program tangibly embodied on one or more program storage devices. The application program may be executed by any machine, device or platform comprising suitable architecture. It is to be further understood that, because some of the constituent system modules and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
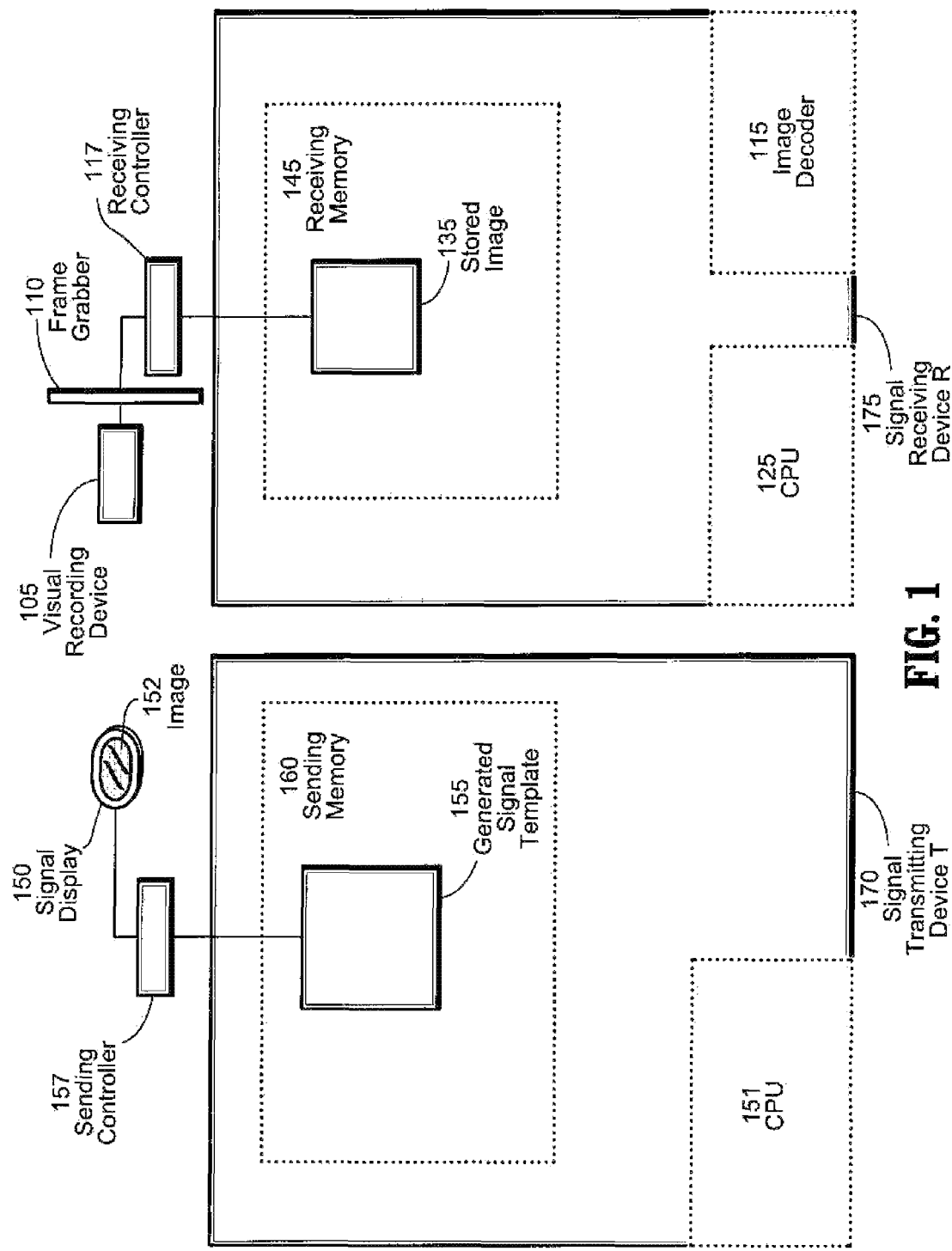
FIG. 1 is a block diagram of a system architecture for providing communication between a signal transmitting device and a signal receiving device according to an embodiment of the present invention.

Referring now to FIG. 1, a block diagram illustrates a system architecture for providing communication between a signal transmitting device and a signal receiving device according to an embodiment of the present invention. Signal transmitting device T 170 includes a sending CPU 151 and a signal display 150 that can display various patterns corresponding to signals to be transmitted to signal receiving device R 175. Generated signal template 155 generates these signal patterns to be transmitted, which are stored in sending memory 160. Sending controller 157 controls the position and orientation of the signal display 150.

When transmission of the signal takes place, visual recording device 105, which includes a receiving CPU 125, takes a picture of an image 152 displayed by signal display 150. Receiving controller 117 controls the position and orientation of the visual recording device 105. The sending controller 157 and the receiving controller 117 enable adjustments to be made so that a visual connection can be established between the visual recording device and the signal display; in other words, so that the visual recording device and the signal display can locate each other. Frame grabber 117 then sends the image to receiving memory 145, where it is stored as a stored image 135. An image analysis process is then commenced by image decoder 115 in which the signal is decoded.

Figure 2:
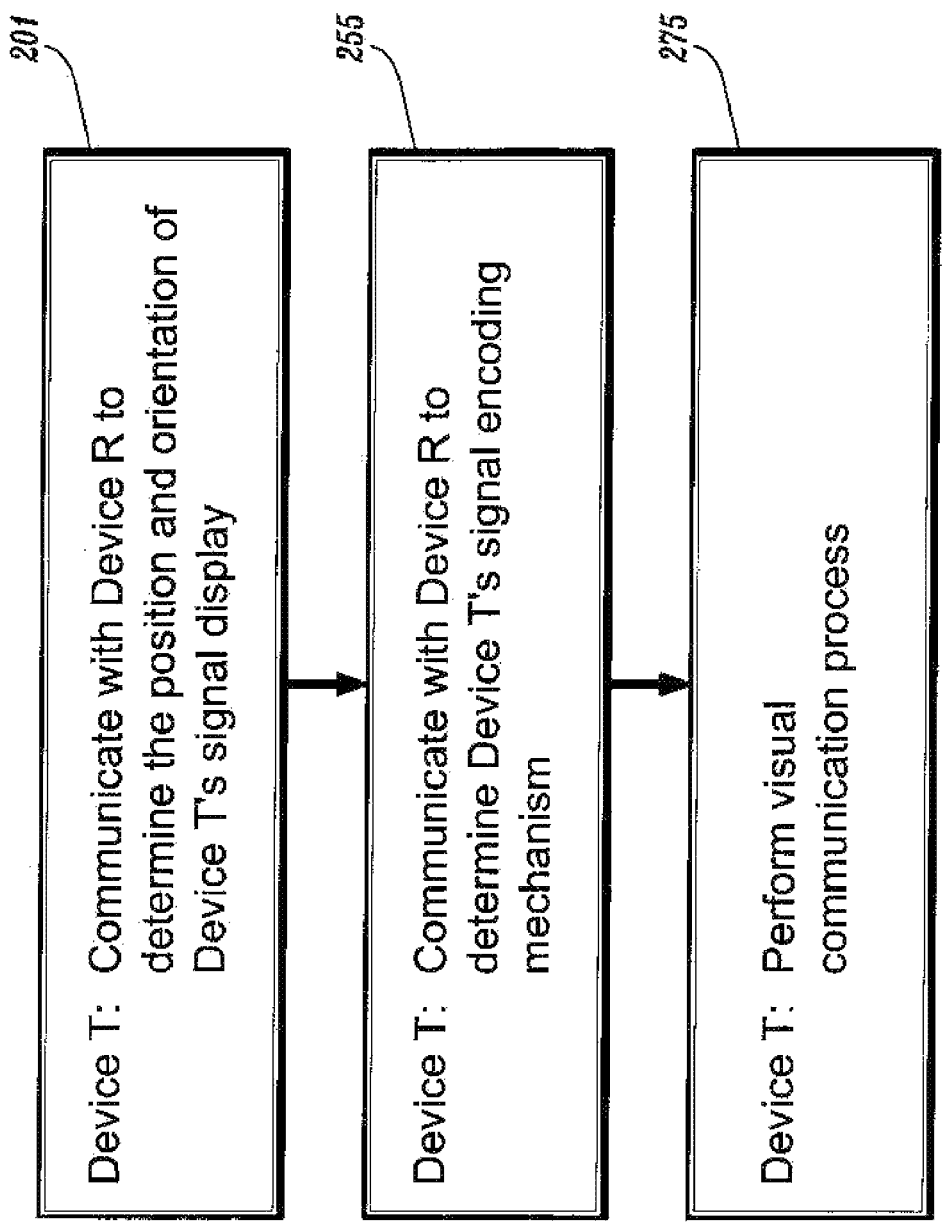
FIG. 2 is a flow chart of a communication process for signal transmitting device T (170) according to an aspect of the present invention.

FIG. 2 is a flow chart depicting an example of a communication process for signal transmitting device T in which T communicates with R according to one aspect of the present invention. This process includes the step of device T communicating with device R to determine the position and orientation of device T's signal display (201). The communication process of step 201 can be executed using existing wireless technology, or can be done manually by a person. In step 255, device T communicates with device R to determine T's signal encoding strategy. After device T has determined the position and orientation of its signal display and its signal encoding mechanism, it then performs a visual communication process 275, in which a signal is transmitted from T to R.

Figure 3:
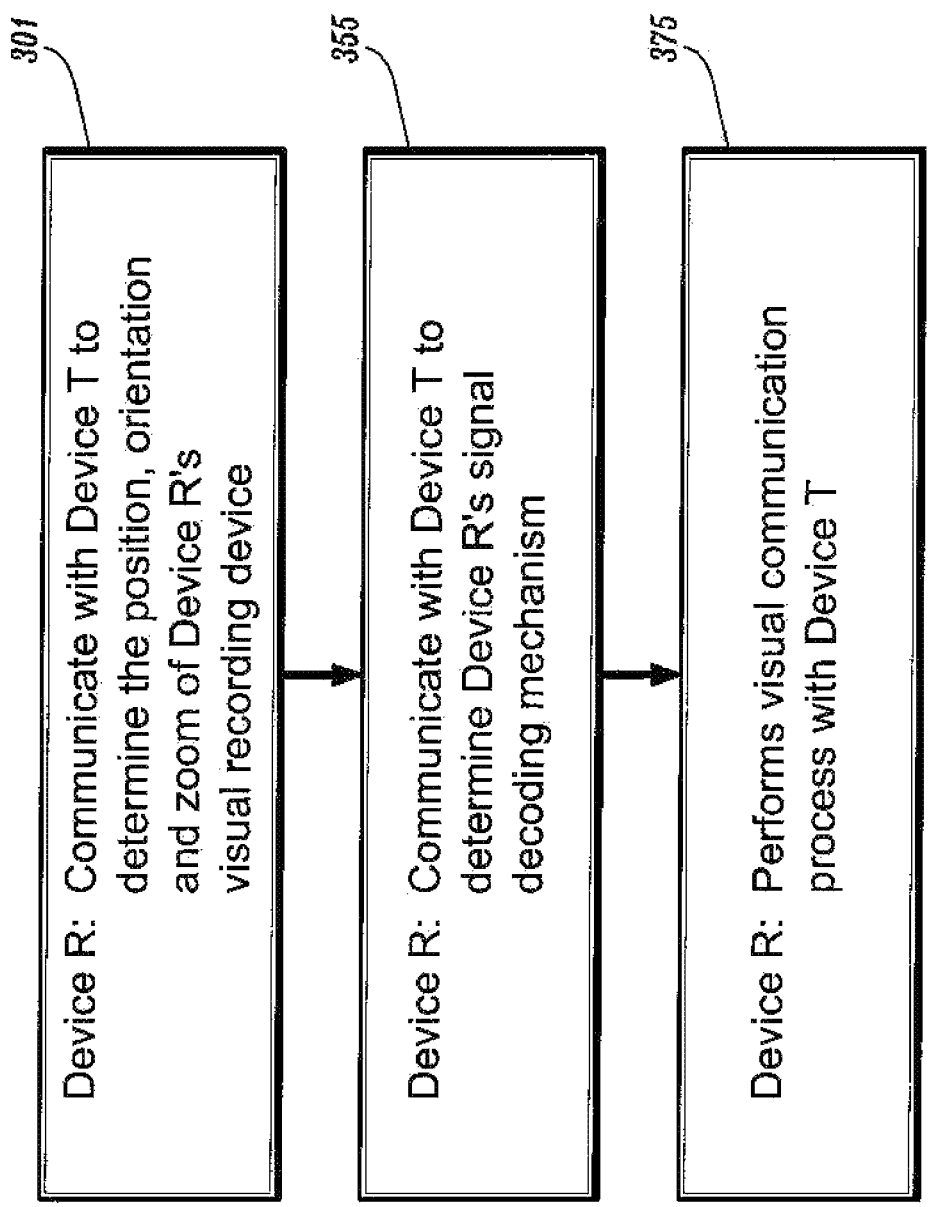
FIG. 3 is a flow chart of a communication process for signal receiving device R (175) according to an aspect of the present invention.

FIG. 3 is a flow chart depicting an example of a communication process for signal receiving device R in which R communicates with T according to one aspect of the present invention. This process includes the step of device R communicating with device T to determine the position, orientation and zoom of device R's visual recording device (301). The communication process of step 301 can be carried out using existing wireless communication technology or can be done manually by a person. In step 355, device R communicates with device T to determine R's signal decoding mechanism. Following these steps, device R performs a visual communication process (375) with device T, in which R receives and decodes a signal from T.

Figure 4:
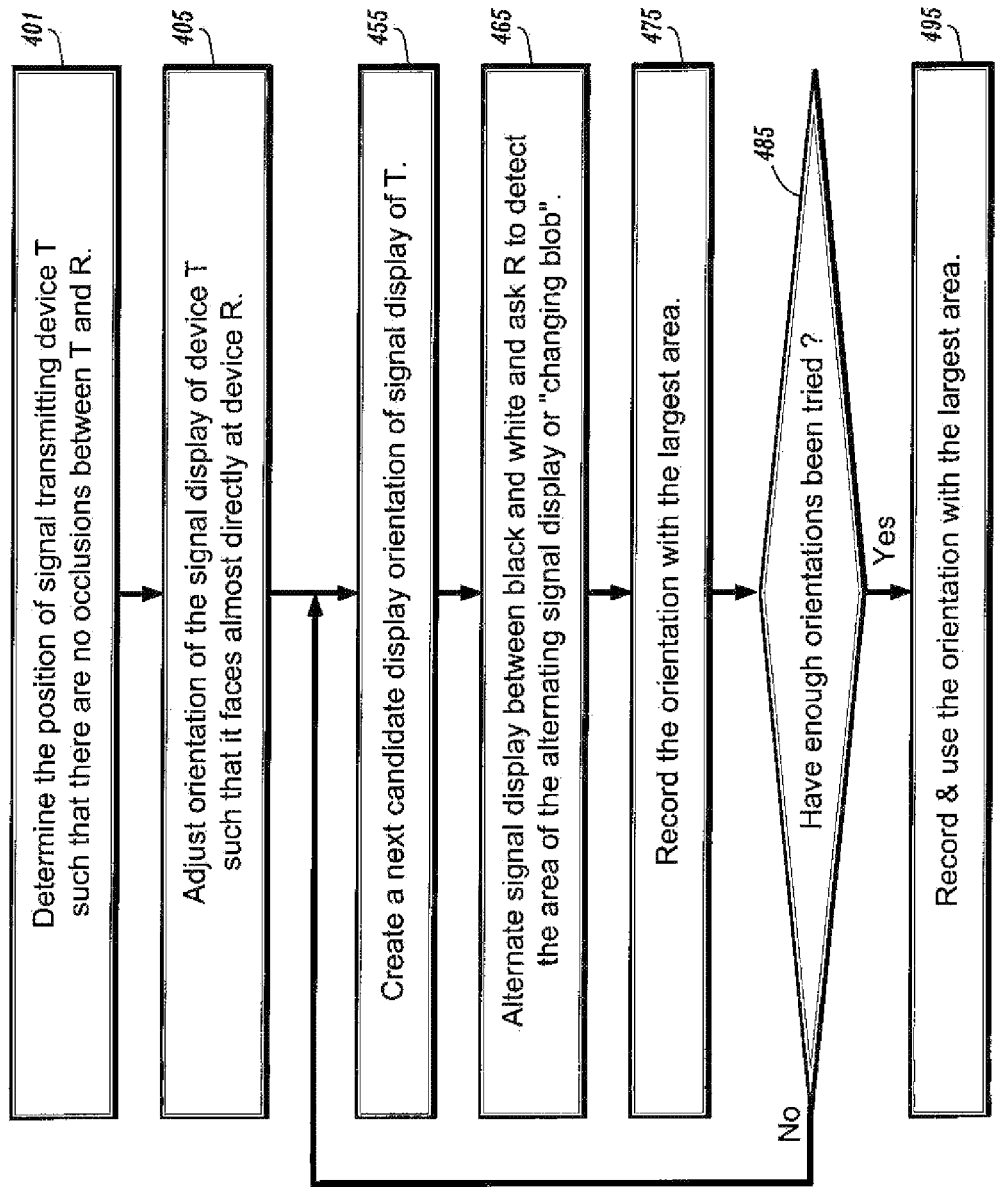
FIG. 4 is a flow chart depicting an example of the process of step 201 of FIG. 2 in which the position and orientation of T's signal display is determined according to an aspect of the present invention.

The flow diagram of FIG. 4 depicts an example of the process of step 201 for determining position and orientation of the signal display 150 of T to enable a communication channel with device R according to an aspect of the present invention. Initially, the position of the signal transmitting device T is determined such that there are no occlusions (i.e., physical obstacles) between the signal transmitting device T and the signal receiving device R (step 401). Next, the orientation of the signal display 150 of the signal transmitting device T is adjusted so that the signal display of signal transmitting device T almost directly faces signal receiving R (step 405). Various orientations are tried each time. A next candidate display orientation of the signal display of device T is then created (step 455). After a display orientation is selected, signal display 150 alternates its display, for example, between black and white and asks device R to detect the area of alternating display or "changing blob"; at the same time, device R will detect the area of the alternating display based on the images taken by its visual recording device (step 465).

The orientation of the signal display T when the area of the alternating display is largest is recorded by device R. (step 475). It is then ascertained whether enough orientations have been tried (step 485). If not, go back to step 455 and repeat the process thereon. If enough orientations have been tried, the orientation of the signal transmitting device T where the area calculated by the signal receiving device was largest is recorded by T (step 495). This is the orientation in which the signal display of T is perpendicular to the line connecting the center of the signal display of T and the center of the visual recording device of the signal receiving device R.

Figure 4A:
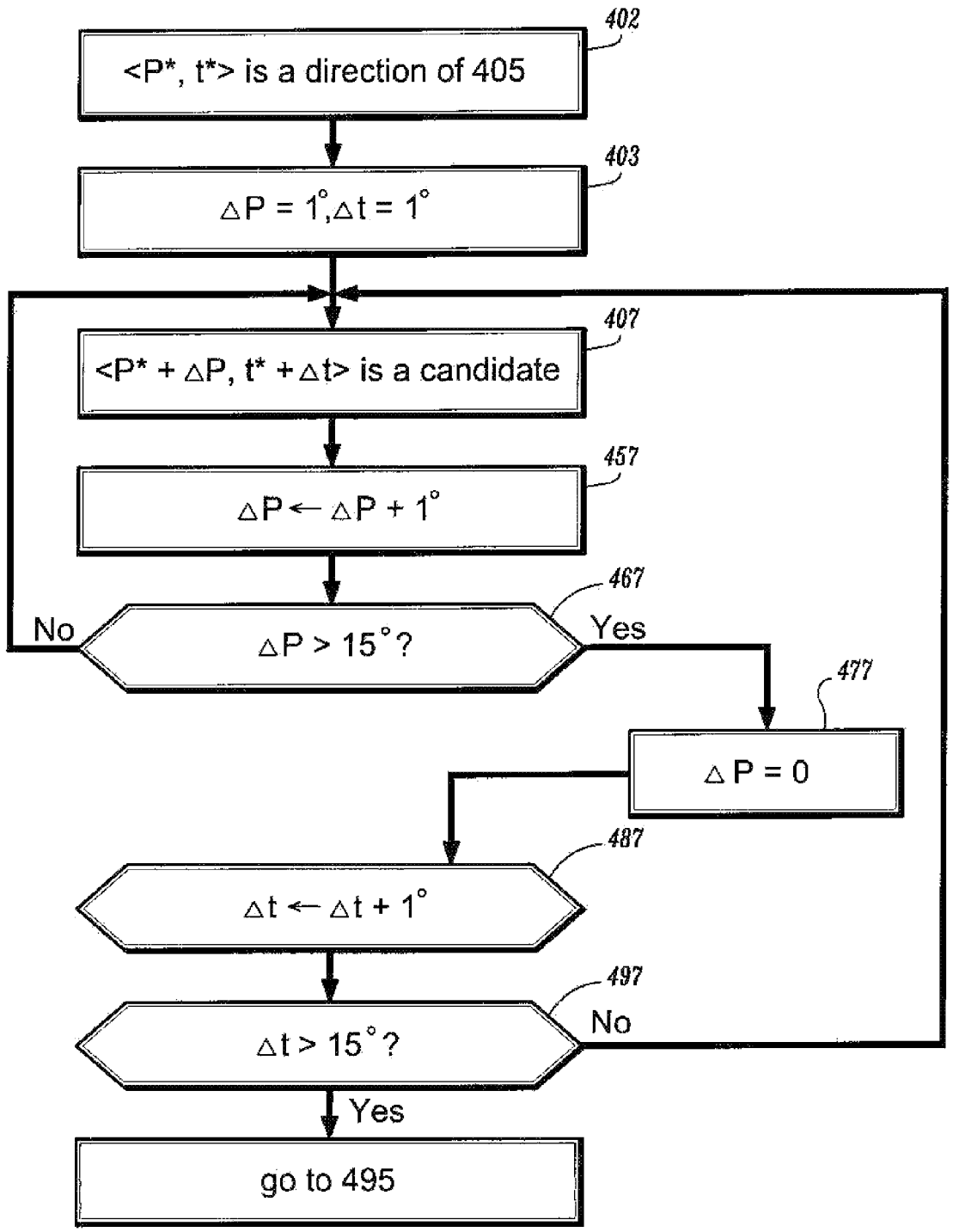
FIG. 4A is a flow chart depicting an example of the process of step 455 of FIG. 4 in which all possible candidate directions are generated.

An example of a detailed description depicting the process of step 455 is illustrated in FIG. 4A. FIG. 4A illustrates the process of generating all possible candidate directions (each candidate direction is then tried individually by the person depicted in FIG. 4 above). For example, if the orientation of the signal display of T is <p*,t*> in step 405, all candidate directions are given by the exemplary process described as follows. (It is to be appreciated that the direction <p*,t*> can also be a candidate direction). First, the orientations of p* and t* are changed by 15 degrees; thus $\Delta p=-15^*$, $\Delta t=-15^*$ (step 403). Candidate directions are therefore represented by <p*+$\Delta p$, t*+$\Delta t$> (step 407). Next, $\Delta p$ is increased in increments of 1 degree (step 457). It is then ascertained whether $\Delta p > 15^*$ (step 467). If no, then the process from step 407 is repeated. If yes, then $\Delta p=0$ (step 477).

Next, $\Delta t$ is increased in increments of 1 degree (step 487). After each increase, it is ascertained whether $\Delta t > 15^*$ (step 497). If no, then the process from step 407 is repeated. If yes, then all possible candidates have been created, and the process proceeds to step 495 of FIG. 4.

Figure 5:
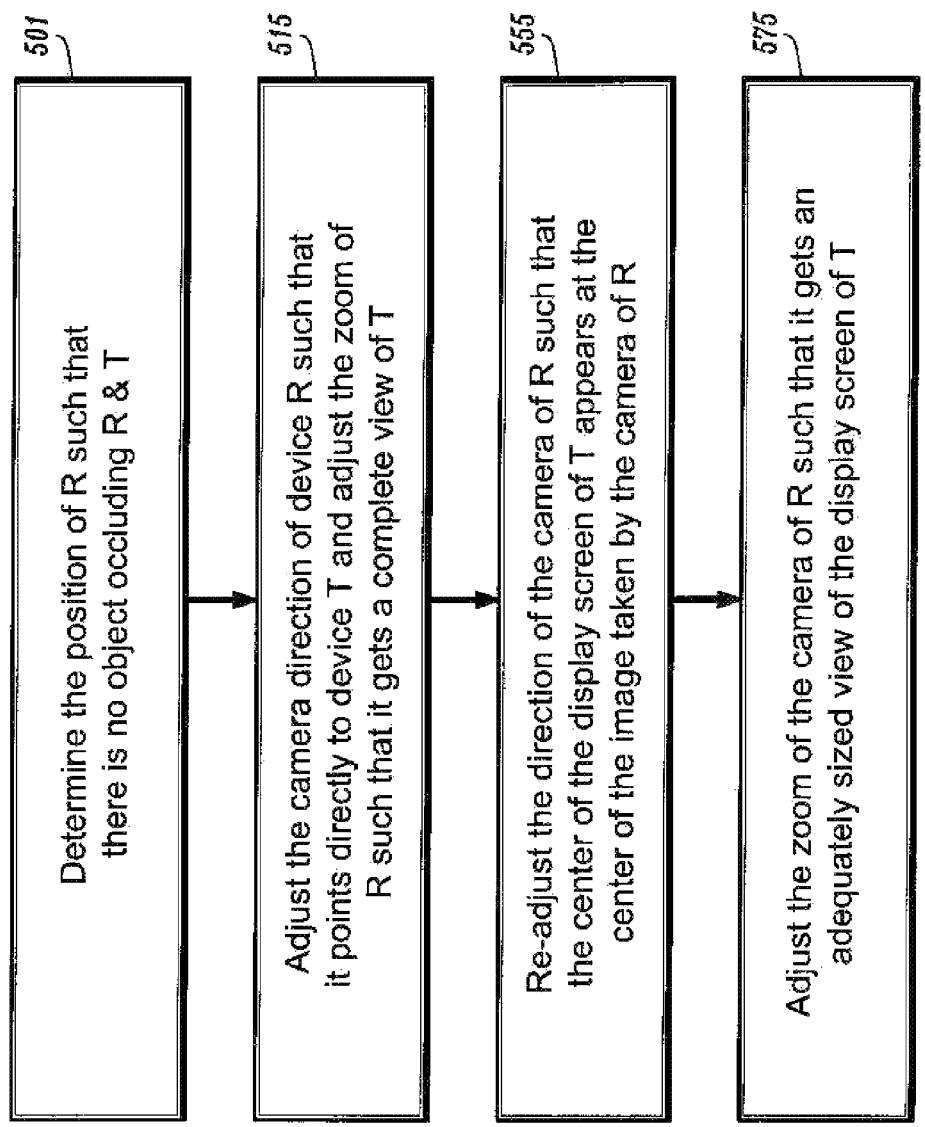
FIG. 5 is a flow chart depicting an example of the process of step 301 of FIG. 3 in which the position, orientation and zoom of the visual recording device of device R is determined according to an aspect of the present invention.

Referring now to FIG. 5, a flow chart depicts an example of the process of step 301 of FIG. 3 in which the position, orientation and zoom of the visual recording device of device R is determined according to an aspect of the present invention. Initially, the position of device R is determined such that there is no object occluding device R and device T (step 501). Next, the direction of the visual recording device of the signal receiving device R is adjusted such that it points to the center of the signal display of device T, and the zoom of the visual recording device is adjusted such that it gets a complete view of the signal transmitting device T (step 515), "complete view" here can mean a view that is not necessarily centered. The direction of the visual recording device is re-adjusted so that the center of the signal display of device T appears at the center of the image taken by the visual recording device of R (step 555). The zoom of the visual recording device is then re-adjusted so that an adequately sized view of the signal display of device T is attained ("adequately sized" or "adequate size" herein meaning that encoded information shown by the signal display is displayed at a size large enough to be analyzed by the visual recording device R).

Figure 6:
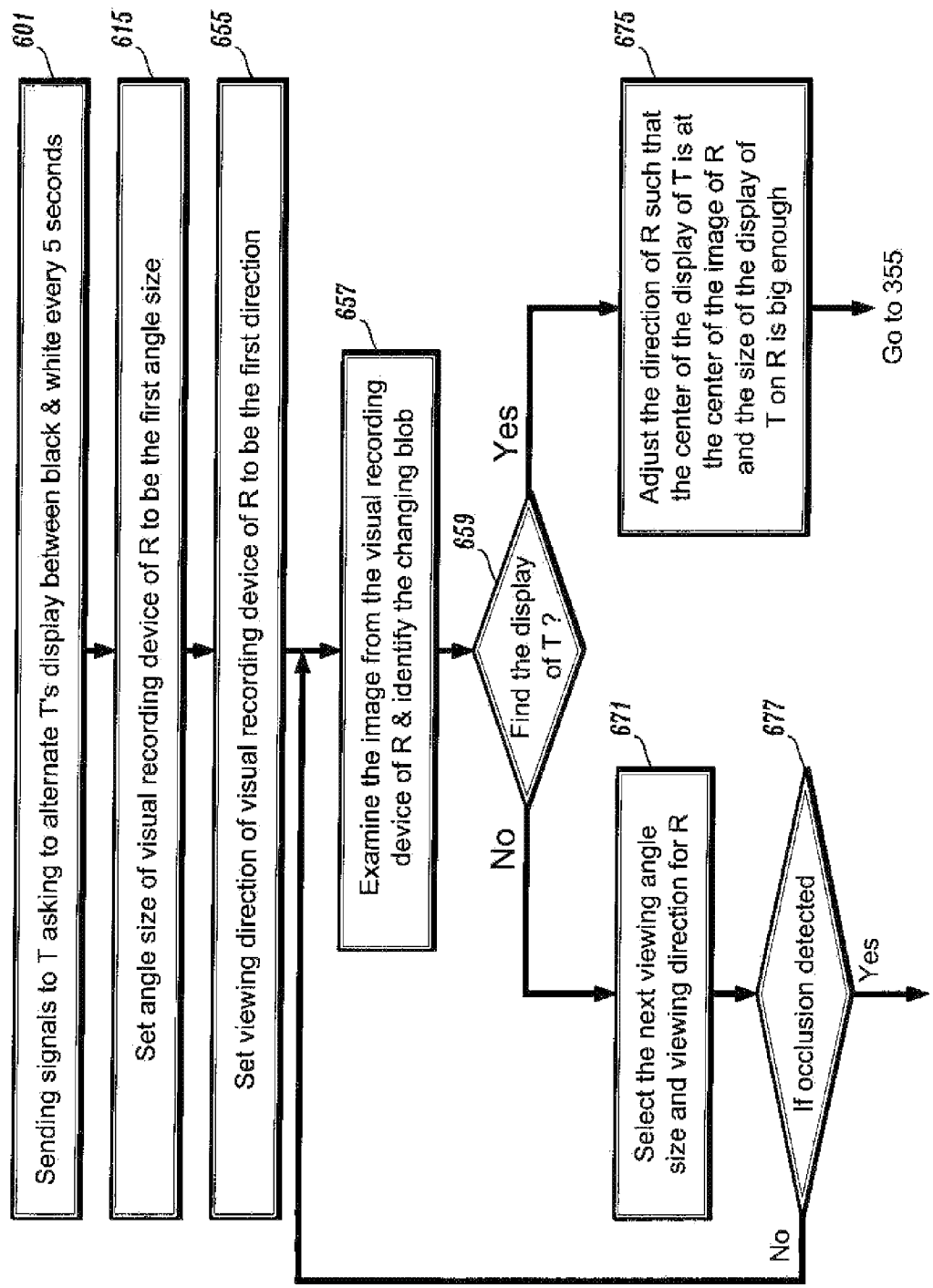
FIG. 6 is a flow chart depicting an example of the process of step 301 in which the pan, tilt, and zoom of the visual recording device of device R is automatically adjusted to view the signal display of T.

Referring now to FIG. 6 a flow chart depicts an example of the process of step 301 in which the pan, tilt and zoom of the visual recording device of R is automatically adjusted to view the signal display of T in an aspect of the present invention.

Initially, device R (175) sends signals to device T (170) asking T to alternate the color of T's signal display (150), for example, between black and white within a certain period of time, for example, every 5 seconds (step 601). Next, the angle of the visual recording device of R is set to be a first visual angle size (615). In addition, the viewing direction of the visual recording device of R is set to be the first direction (step 655). The images grabbed from the visual recording device of R are then examined to identify the alternating display of signal device T, or "changing blob" within the images (step 657). Device R then determines whether the alternating display of device T can be found from the images (step 659).

If the signal display of device T cannot be found, a new viewing angle size and viewing direction can be selected for the visual recording device of R (step 671). It is then determined whether any occlusions are detected (step 677). If an occlusion is detected, step 501 is repeated. If there are no occlusions, then the process goes back to step 657 and repeats the steps thereon.

If the signal display of device T is found, the viewing direction of the visual recording device of R can be adjusted so that the center of the signal display of T is at the center of the image grabbed from the visual recording device of R, and the zoom is adjusted so that the image of the signal display of T is large enough; "large enough" meaning for example, that the image of the display screen is at least 75% of the entire image being captured by the visual recording device of R, and that the image of the display screen is completely within the entire image captured by the visual recording device of R (step 675). Following this step, the process goes back to step 355 and repeats the steps thereon.

Figure 7:
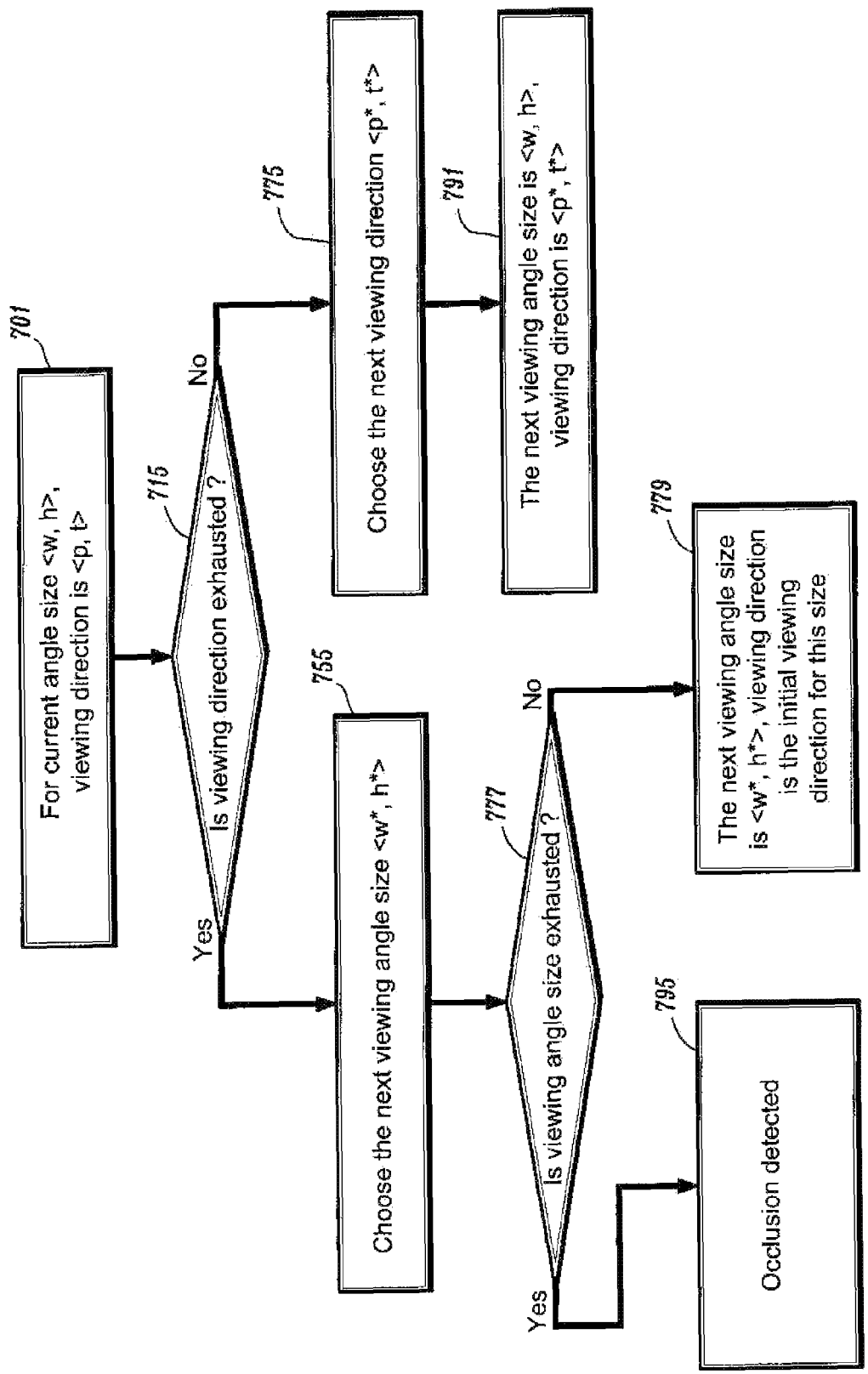
FIG. 7 is a flow chart depicting an example of the process of step 671 of FIG. 6 in which a next viewing direction and angle size for device R is selected.

For device R to find the signal display of T, R's visual recording device should try a variety of different viewing directions and viewing angles. Referring now to FIG. 7, a flow chart depicts an example of the process of step 671 of FIG. 6 in which a next viewing direction and angle size for device R is selected in an aspect of the present invention. As an illustration, for the current angle size <w,h> of the visual recording device R, the current viewing direction of the visual recording device is <p,t> (step 701). Here for example, w represents the width of the visual recording device angle size, h represents the height of the visual recording device angle size; t (tilt) is the angle between the vertical direction that is pointing up and the viewing direction of the visual recording device, and p (pan) is the counterclockwise angle between the north direction (on a dimensional plane) and the viewing direction of the visual recording device. Next, it is determined whether all possible viewing directions have been tried (step 715).

If all possible viewing directions have been tried, then a next viewing angle size <w*,h*> is chosen (step 755). It is then determined if all possible viewing angle sizes have been tried (step 777). If yes, then the result is that an occlusion has been detected (795). If no, then a next viewing angle size <w*,h*> is tried, the viewing direction being the initial viewing direction <p,t> (step 779).

If all viewing directions have not been tried, then a next viewing direction <p*,t*> is chosen (step 775). The angle size remains <w,h> and the viewing direction is <p*,t*> (step 791).

Figure 8:
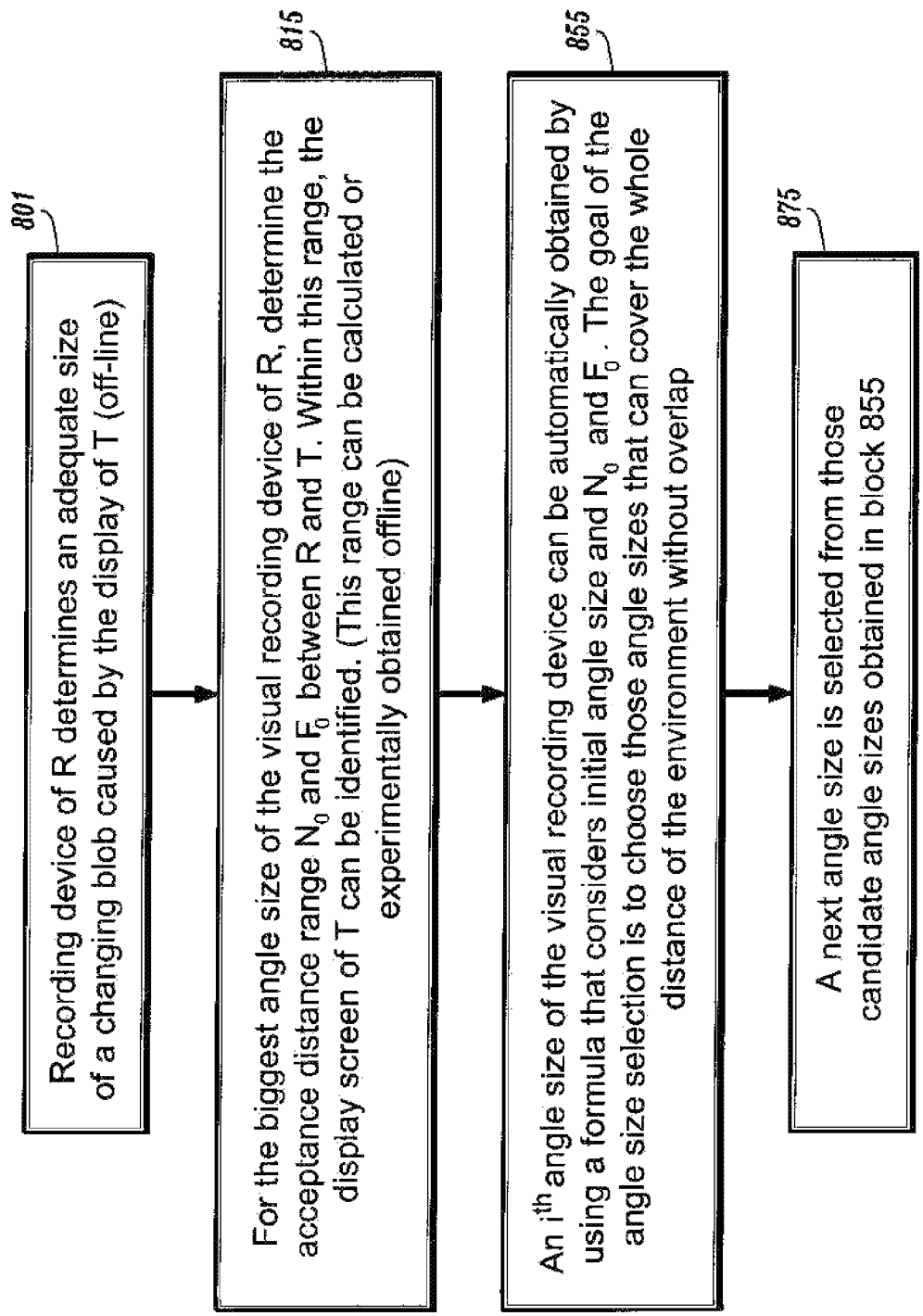
FIG. 8 is a flow chart depicting an example of the process of step 755 of FIG. 7 in which a viewing angle size for the visual recording device of device R is automatically selected.

In one aspect of the present invention, the angle size of the visual recording device of R is automatically selected. Referring now to FIG. 8, a flow chart depicts an example of the process of step 755 of FIG. 7 in which a next viewing angle size for the visual recording device of R is automatically selected. Initially, the visual recording device of R determines an adequate size of a changing blob caused by the signal display of T (step 801). This determination can be made "off-line," meaning that this step can be performed individually without going through the other steps in the process. For a largest angle size of the visual recording device of R, an acceptance distance range N0 and F0 between the visual recording device of R and the signal display of T is then determined (step 815). The acceptance distance range is the range in which the signal display of T can be identified and its encoded information analyzed; it is necessary to have an adequately sized view of the signal display. N0 represents the nearest distance at which an adequately sized view of the signal display can be obtained, and F0 represents the farthest distance at which an adequately sized view of the signal display can be obtained ("adequately sized" again meaning a size large enough such that the encoded information of the signal display can be analyzed). To illustrate, for a given acceptance distance range of the signal display of X for the visual recording device of Y, if x is outside this range then it will not be able to be detected by the visual recording device of Y with a very high degree of certainty. For example, for a fixed visual recording device angle size of Y, if the signal display of X is too close to Y, then the image of the display of X might be too large to put into the image screen of the visual recording device of Y. Thus, the distance between X and Y should be large enough so that Y can get a good view of X (i.e., the image of the display of X should not be too large). The acceptance distance range can be calculated or experimentally obtained off line if the size of the signal display of T is known.

Next, a candidate or the "$i^{th}$" angle size of the visual recording device is determined (step 855). This can be automatically obtained using a formula that considers $N_0$, $F_0$, and the initial angle size of the visual recording device. The object of this angle size selection process is to choose a set of angle sizes or zoom such that they can cover the whole distance of the environment without overlap. To cover the whole distance means that regardless of where T is, there will be one angle size of R that can get an "adequately sized" view of T. For example, for a given distance from the signal display, it is desirable to choose as few angle sizes ("zooms") as possible which still enable the visual recording device to get an adequately sized view of the signal display, i.e., "adequately sized view", again meaning that the entire image of the signal display is visible and at a size large enough such that the encoded information of the signal display can be analyzed.

The following formulas can be used in selecting the $i^{th}$ angle size of the visual recording device, where [w,h]=angle size and [w0,h0] represents an initial given angle size:

$$wi = 2\arctan\left[\frac{N_0}{F_0}\right]^i \tan\left(\frac{w_0}{2}\right)$$

$$hi = 2\arctan\left[\frac{N_0}{F_0}\right]^i \tan\left(\frac{h_0}{2}\right)$$

In this way, we can get a set of angle sizes [w0,h0], [w1, h1], . . . [wq,hq].

The next angle size of the visual recording device is selected from the candidate angle sizes obtained from the above formulas (step 875).

Figure 9:
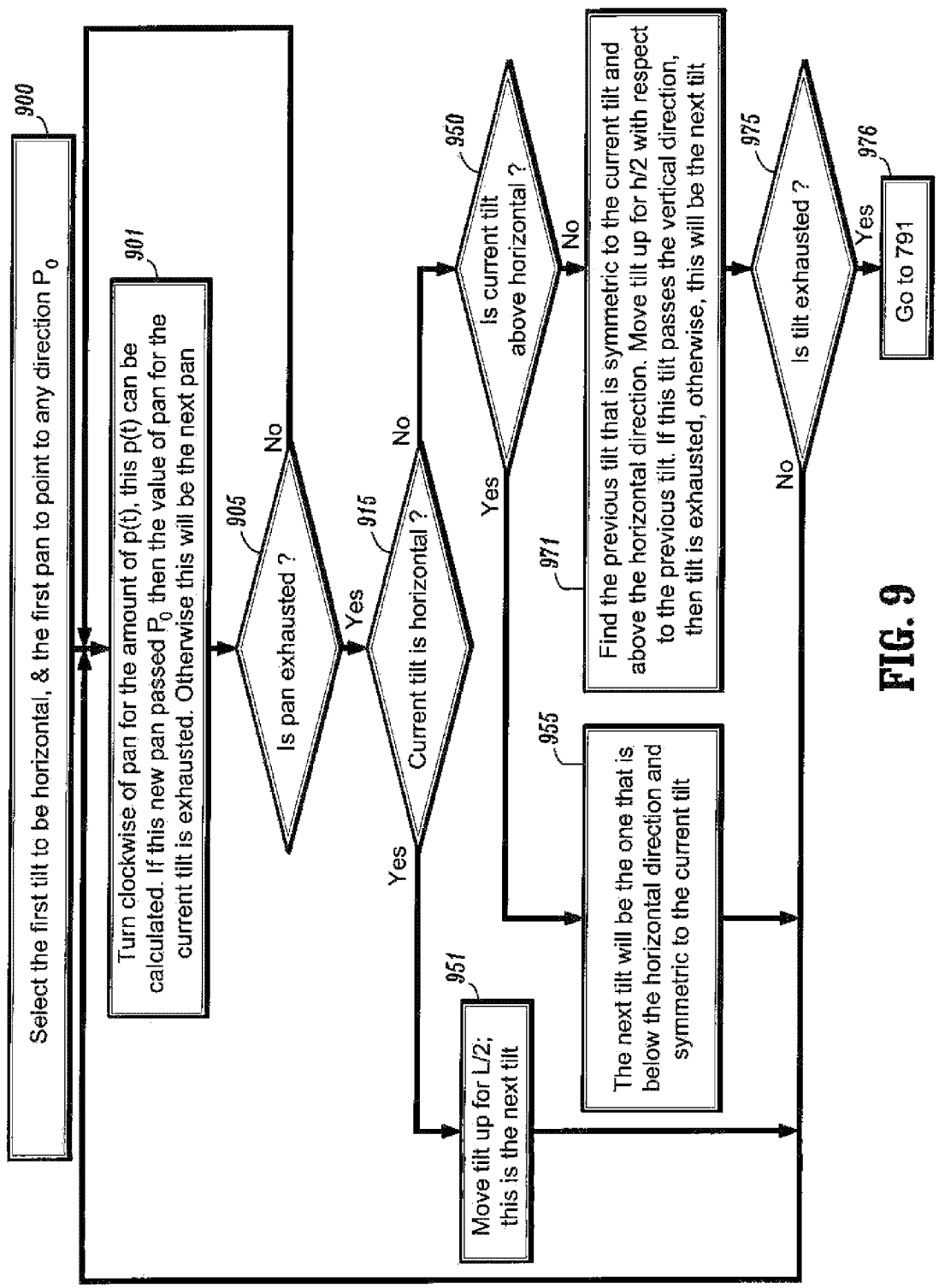
FIG. 9 is a flow chart depicting an example of the process of step 775 of FIG. 7 in which a viewing direction for a given angle size of the visual recording device of device R is automatically selected according to an aspect of the present invention.

As shown in step 775 of FIG. 7, if all viewing directions of the visual recording device of R have not been tried, a new viewing direction can be selected. In one aspect of the present invention, a next viewing direction can be automatically selected by R. Referring now to FIG. 9, a flow chart depicts a method of automatically selecting the viewing direction, pan, and tilt of the visual recording device of R for a given camera angle size [w,h].

For illustrative purposes, the first tilt selected is horizontal and the first pan can point in any direction P0 (step 900). The visual recording device of R is panned clockwise in the amount p(t); this p(t) can be a calculated amount. If the new value p(t) passed the original value P0, then the value of the pan for the current tilt (horizontal) is exhausted; if the value p(t) did not pass P0, then p(t) will be the next pan (step 901).

In step 905, it is determined whether all pan directions have been exhausted. If yes, than it is then determined if the current tilt is horizontal (step 915). If the current tilt is horizontal, the tilt is moved up for h/2; this is the next tilt (step 951). If the current tilt is not horizontal, it is then determined if the tilt is above horizontal (step 950). If the current tilt is above horizontal, the next tilt will be that which is below the horizontal and symmetrical to the current tilt (step 955). If the current tilt is below the horizontal, in step 971 a previous tilt that is symmetrical to the current tilt and above the horizontal is determined. The tilt is moved up for h/2 with respect to the previous tilt; if this tilt passes a vertical direction with respect to the original horizontal position, then the tilt is exhausted. If this tilt does not pass the said vertical direction, than it will be the next tilt value. It is then determined if the tilt is exhausted (step 975). In the case that the tilt is not exhausted, than step 901 is repeated to select a next pan, and the process thereon is then repeated. If the tilt is exhausted, then the process goes back to step 791 (step 976).

The following equation can be used as an example of how to calculate the amount p(t), where p represents a pan for a given tilt t (step 901):

$$2\arctan\left\{\frac{\sin\left(\frac{h}{2}\right)}{\sin\left(t\frac{h}{2}\right)}\right\}$$

Figure 10:
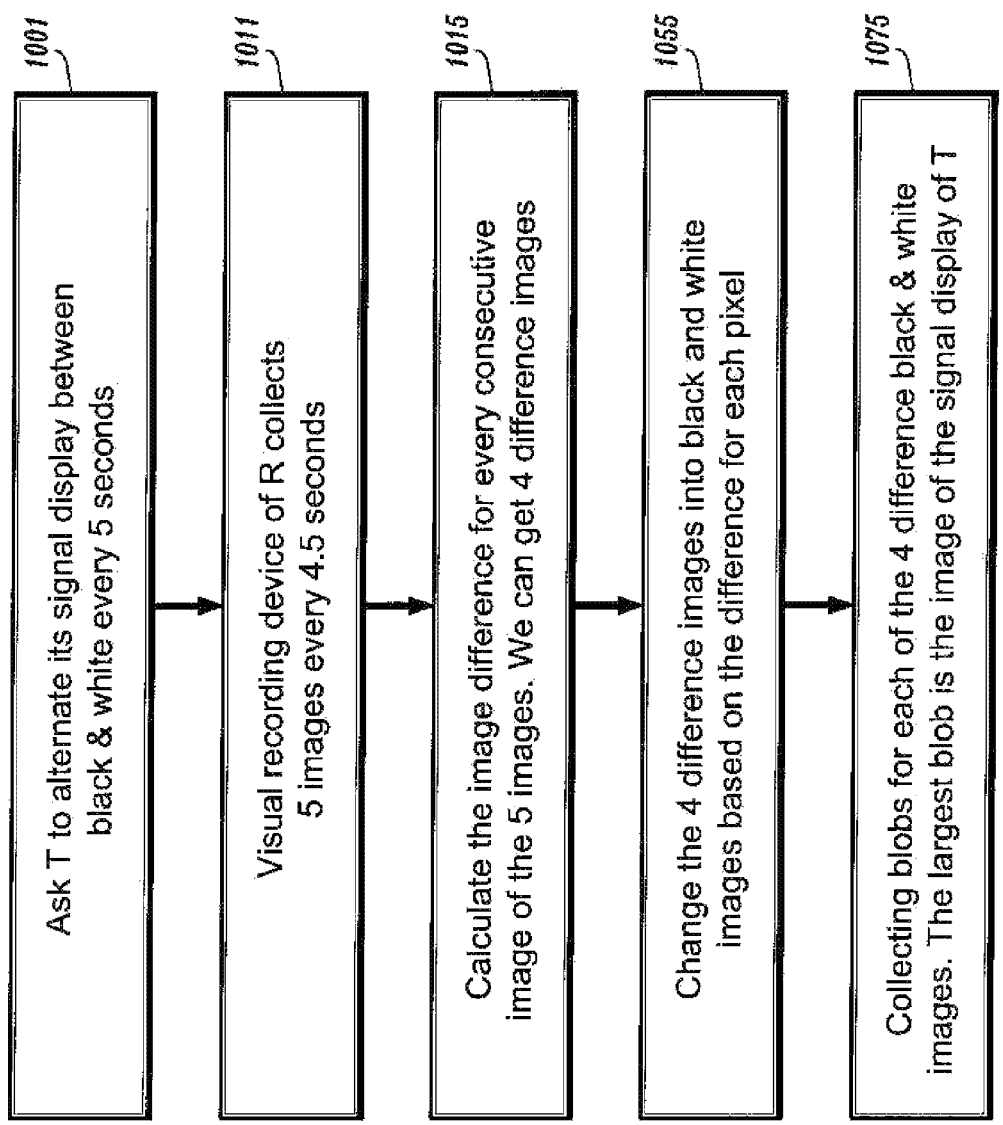
FIG. 10 is a flow chart depicting an example of the process of step 657 of FIG. 6 in which changing images are detected to find the signal display of device T according to an aspect of the present invention.

In order for the visual recording device of R to detect the signal display of T, a method is employed in the present invention in which the signal display of T alternates its display, for example, between black and white, and an image difference is calculated for every consecutive alternating signal display image. The image differences are then converted into black or white images and the visual recording device of R searches for and collects these alternating image difference "blobs". A blob is a group of adjoining pixels each having an identical pixel value. Referring not to FIG. 10, a flow chart depicts an example of a process of step 657 of FIG. 6, in which device R identifies and verifies an alternating image difference blob from the signal display of T.

First, device R asks the signal transmitting device T to alternate its signal display between black and white within a certain period of time, for example 5 seconds (step 1001). The visual recording device of R then collects a number of images within an allotted time, for example, it collects 5 images every 4.5 seconds (step 1001). An image difference between each of the 5 consecutive images is then calculated; the result here would be 4 image differences (step 1015). To illustrate the process of calculating the image difference, for a given black and white image with resolution of 100×100 (having a total of 10,000 pixels), each pixel is identified by a coordinate (x,y), where $1 \leq x \leq 100$ and $1 \leq y \leq 100$. Each coordinate (x,y) also has an intensity value between 0-255, where, for instance, a value of 0 means the pixel is black and a value of 255 means the pixel is white. For example, the center pixel of the image, 50×50, may have an image intensity of 0. The center pixel [50,50] for another image may have an image intensity of 255. Therefore, the difference between the center pixels of the two images in this example is 255. For two images A and B, the image difference will be image C, where the intensities of any pixels of C will be the difference of the intensities of corresponding pixels of A and B.

If the images collected by the visual recording device are in color, then the image differences will also be in color. In this case, the pixel coordinate (x,y) has 3 component values for each of the colors red, green and blue, e.g., (r,g,b). Each of the colors red, green and blue has an intensity range of 0-255, For any coordinate (x,y), the image difference for two images at (x,y) will be $(|r_1-r_2|, |g_1-g_2|, |b_1-b_2|)$. The resulting image C is still a color image, where (r, g, b) is the intensity for (x,y) at the first image and $(r_2, g_2, b_2)$ is the intensity for (x,y) at the second image.

These color images are then changed into black and white images based on the intensity value for each pixel (step 1055). For example, it can be specified that when the image difference is greater than 55, the pixel is given a color of white; otherwise, it is black.

For example to illustrate, if:

$$\sqrt{(r_1-r_2)^2+(g_1-g_2)^2+(b_1-b_2)^2}$$

is $\leq 55$, the intensity at (x,y) for the difference image is 0; otherwise it is 255. The alternating image differences or changing blobs are then collected, and the changing blob having the largest area is the image of the signal display of T (step 1075).

Figure 11:
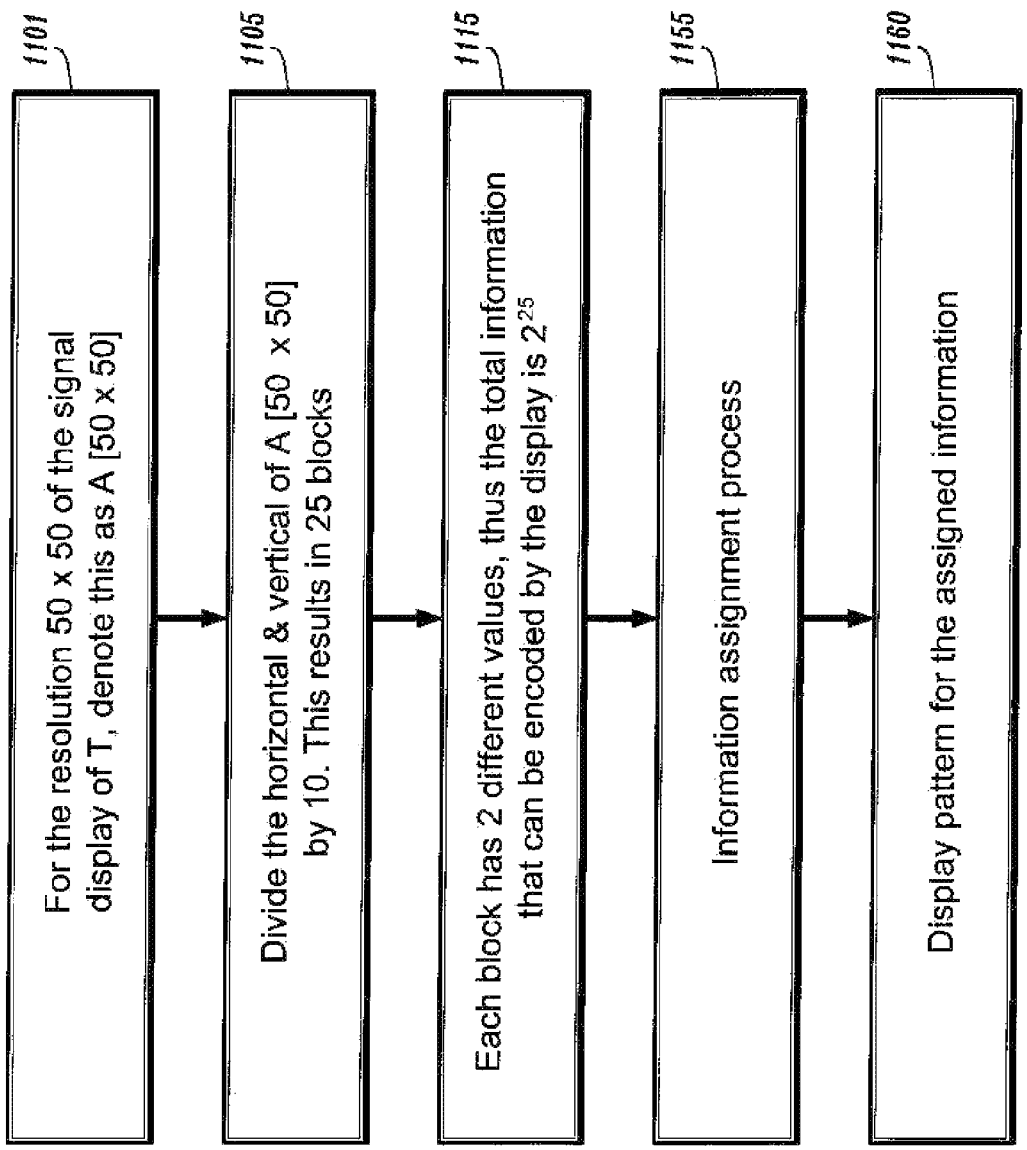
FIG. 11 is a flow chart depicting an example of an encoding strategy determination process of step 255 in FIG. 2 in which device T communicates with device R to determine T's signal encoding mechanism according to one aspect of the present invention.
Figure 12:
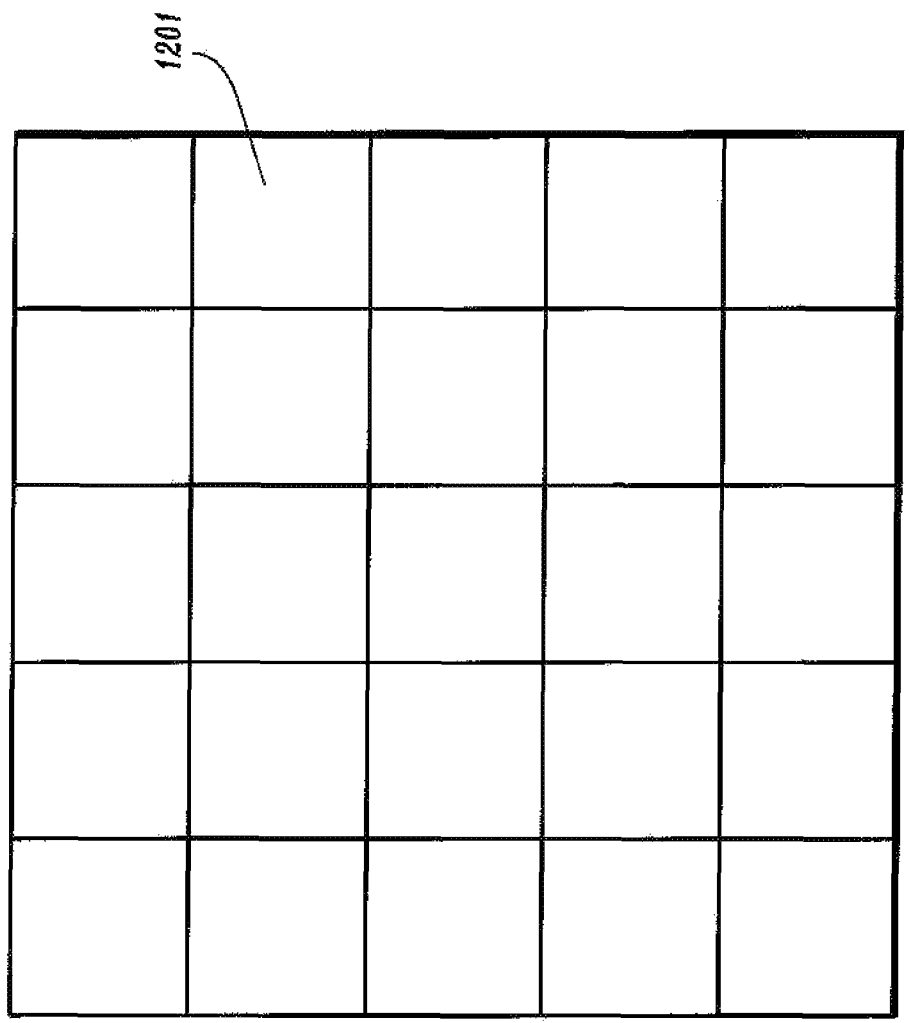
FIG. 12 is an exemplary illustration of the encoding strategy of FIG. 11.

FIG. 11 is the encoding strategy determination process for signal transmitting device T in one aspect of the present invention, as depicted in step 255 of FIG. 2. For illustrative purposes, the resolution of the display device of T is set to 50×50. This is denoted it as: A[50][50] (step 1101). Next, the horizontal and vertical values of A[50][50] are divided by 10. The result is A[5][5], which has a total of 25 individual blocks 1202, as illustrated in FIG. 12. In this example, the intensity values of the pixels within each block are the same; they are either (255,255,255) or (0,0,0) (step 1105). Since each block has, for example, 2 different values here, black or white, the total information that can be encoded by the signal display is $2^{25}$ (step 1115). Next, the information to be transmitted is assigned to one of the patterns represented by A[50][50] (step 1155). The pattern for the assigned information is then displayed (step 1160).

Figure 13:
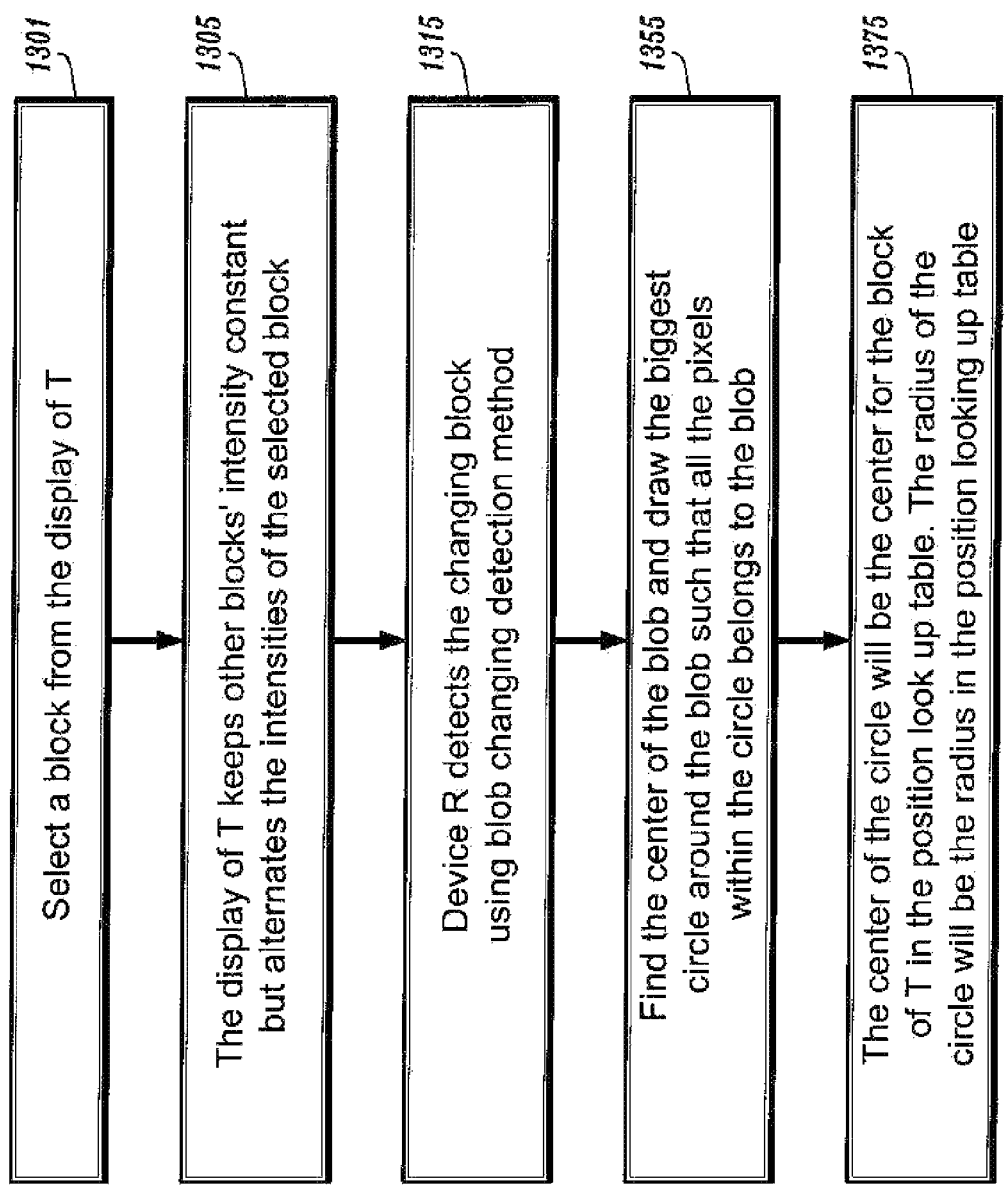
FIG. 13 is a flow chart depicting an example of the process of step 355 of FIG. 3 for building a position and radius size look-up table according to one aspect of the present invention.
Figure 14:
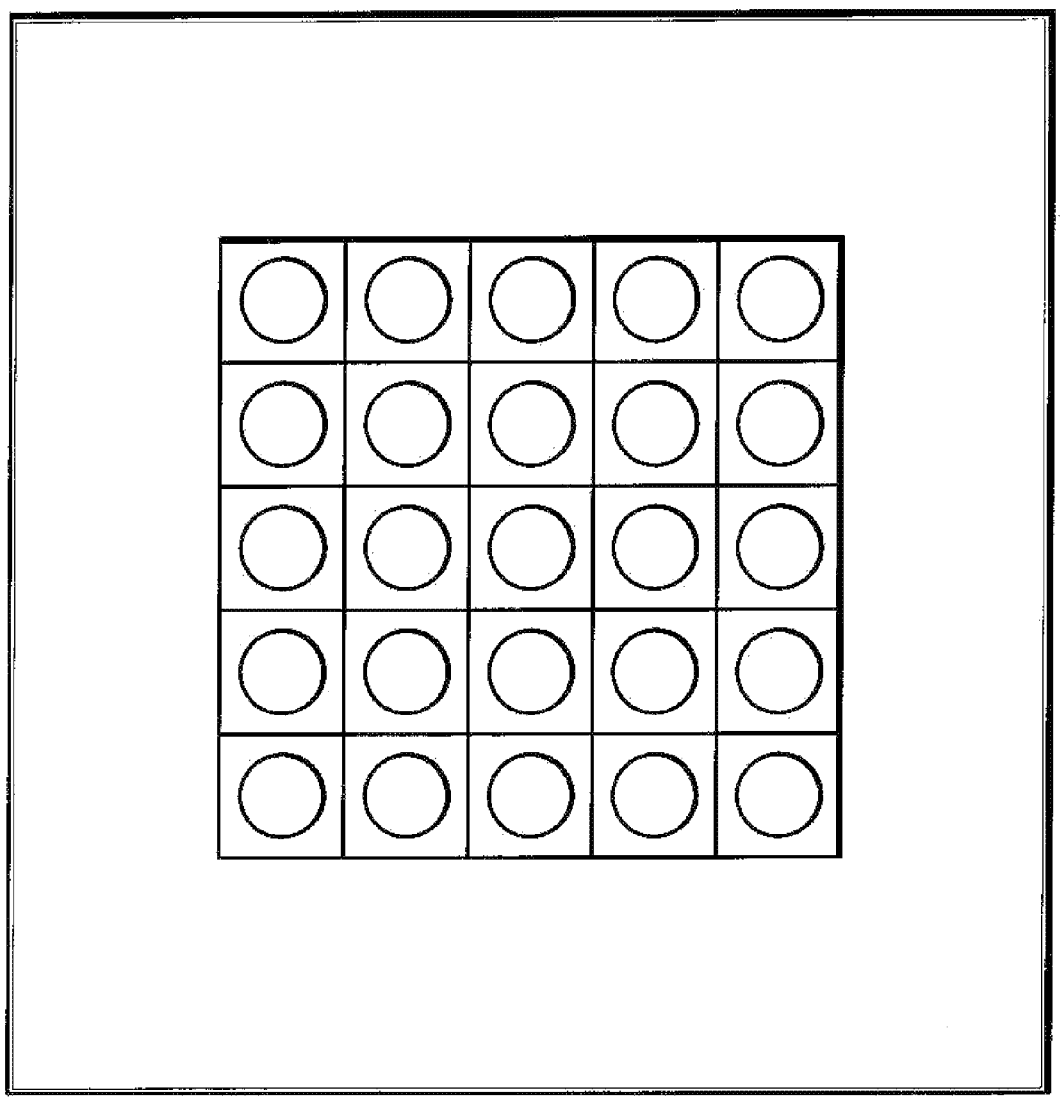
FIG. 14 is an exemplary illustration of a position and radius size look-up table of FIG. 13 according to an aspect of the present invention.

Referring now to FIG. 13, a flow chart depicts an example of a method of building a position an radius look-up table in one aspect of the present invention. This flow chart is an example of a detailed method of determining the signal decoding mechanism of device R, as depicted in step 355. Initially, a block is selected from the signal display of T (step 1301). The intensity of the other blocks of the signal display of T are kept constant, while the intensity of the selected block is alternated (step 1305). The visual recording device of device R then grabs the images and uses the changing blob detection method (described in FIG. 10) to detect the blocks whose intensities are being alternated (step 1315). The center of the "changing blob" or alternating image, is found, and a circle is drawn around the blob such that all the pixels within the circle belong to the blob (step 1355). The center of the circle will be the center for the block in which it resides, and the radius of the circle will be the radius recorded in the position and radius look-up table. FIG. 14 depicts an exemplary illustration of the position and radius look-up table. In one preferred embodiment of the present invention, the radius of the circles should be no more than 0.35 of the length of one block.

Figure 15:
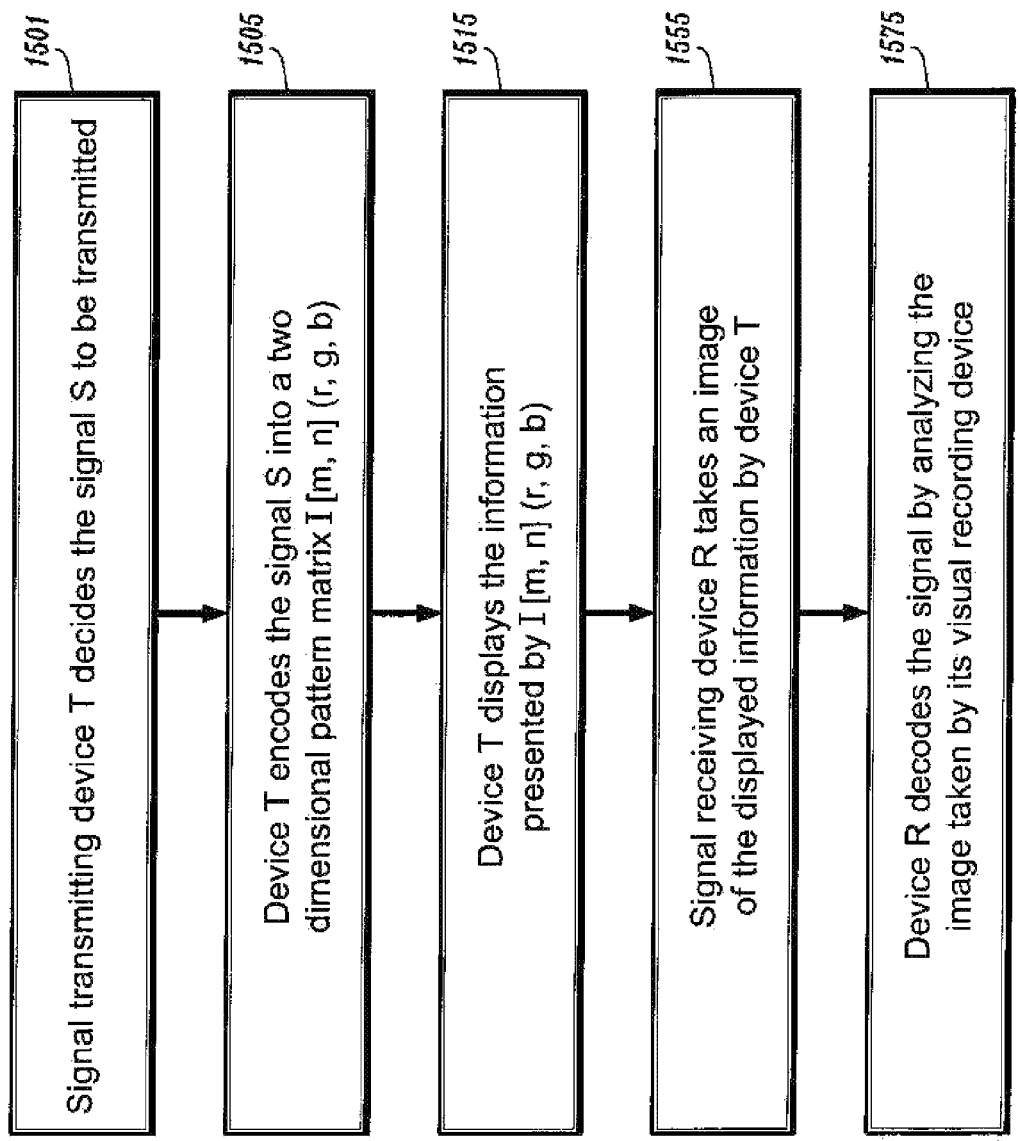
FIG. 15 is a flow chart depicting an example of a visual communication process for device T and device R according to an aspect of the present invention.

FIG. 15 is a flow chart depicting an example of a visual communication process for device T and device R as shown in steps 275 and 375 according to one aspect of the present invention. Initially, signal transmitting device T determines a signal S to be transmitted (step 1501). Device T then encodes the signal S into a two-dimensional pattern matrix I[m,n](r, g,b), where I=intensity, [m,n] represents the position of a pixel, and (r,g,b) represents red, green and blue respectively. (step 1505). Device T then displays the information presented by I[m,n](r,g,b) (step 1515). Next, signal receiving device R takes an image of the information displayed by device T (step 1555). In step 1575, device R then decodes the signal by analyzing the image taken by the visual recording device of R.

Figure 16:
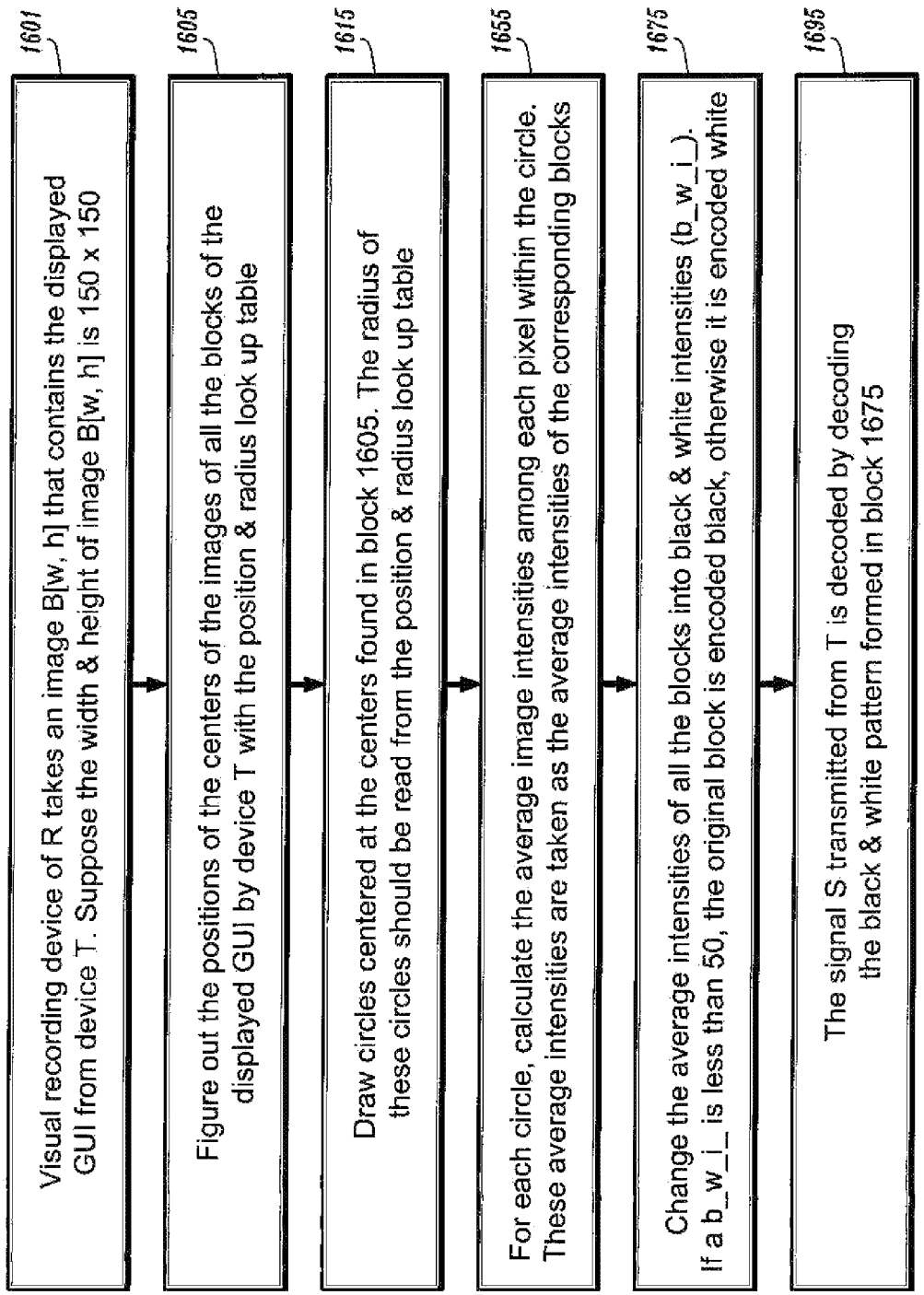
FIG. 16 is a flow chart depicting an example of a visual communication signal decoding process for device R of step 1555 of FIG. 15 according to an aspect of the present invention.

Referring now to FIG. 16, a flow chart depicts an example of a visual communication signal decoding process of device R as discussed in step 1575 of FIG. 15. In an illustrative example, the visual recording device of R takes an image B[w,h] which contains a displayed graphic user interface (GUI) from device T. The variables [w,h] represent width and height, respectively. As an example, the width and height of image B[w,h] is 150×150 (step 1601). Device R then determines the positions of the centers of the images of all the blocks of the display of device T with the position and radius look-up table (step 1605). Circles are then drawn centered at the centers determined in step 1605 above; the radius of these circles should be read from the position and radius look-up table (step 1615).

For each circle, device R calculates the average image intensities among each pixel within the circle. The average image intensity is then calculated for every circle. These average intensities are taken as the average intensities of their respective blocks (step 1655). Device R then changes the average intensities of all the blocks into black and white intensities, each represented by (b_w_i). If a b_w_i is less than a certain amount, for example 50, it can be determined that the original block is encoded as black; otherwise, it is encoded as white (step 1675). The signal S transmitted from T is then decoded by device R by decoding the above black and white pattern formed in step 1675 (step 1695).

Figure 17:
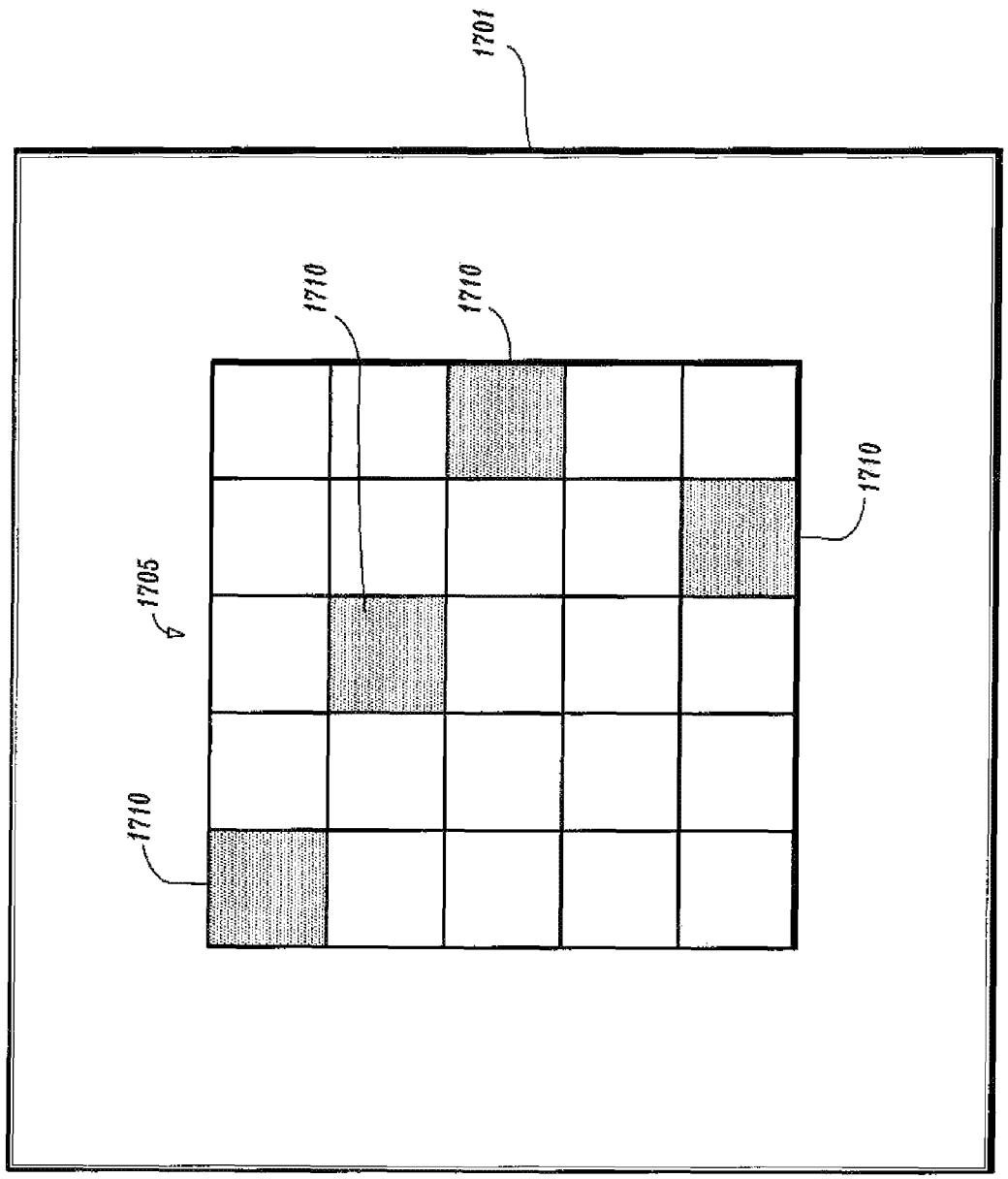
FIG. 17 is an exemplary illustration of step 1655 of FIG. 16 according to an aspect of the present invention.

FIG. 17 depicts an exemplary illustration of step 1655, in which 1701 represents an entire view seen by the visual recording device R. 1705 depicts an exemplary image of the display screen of T, and the grey scale blocks 1710 depict blocks with their respective calculated average image intensities as discussed in step 1655.

Figure 18:
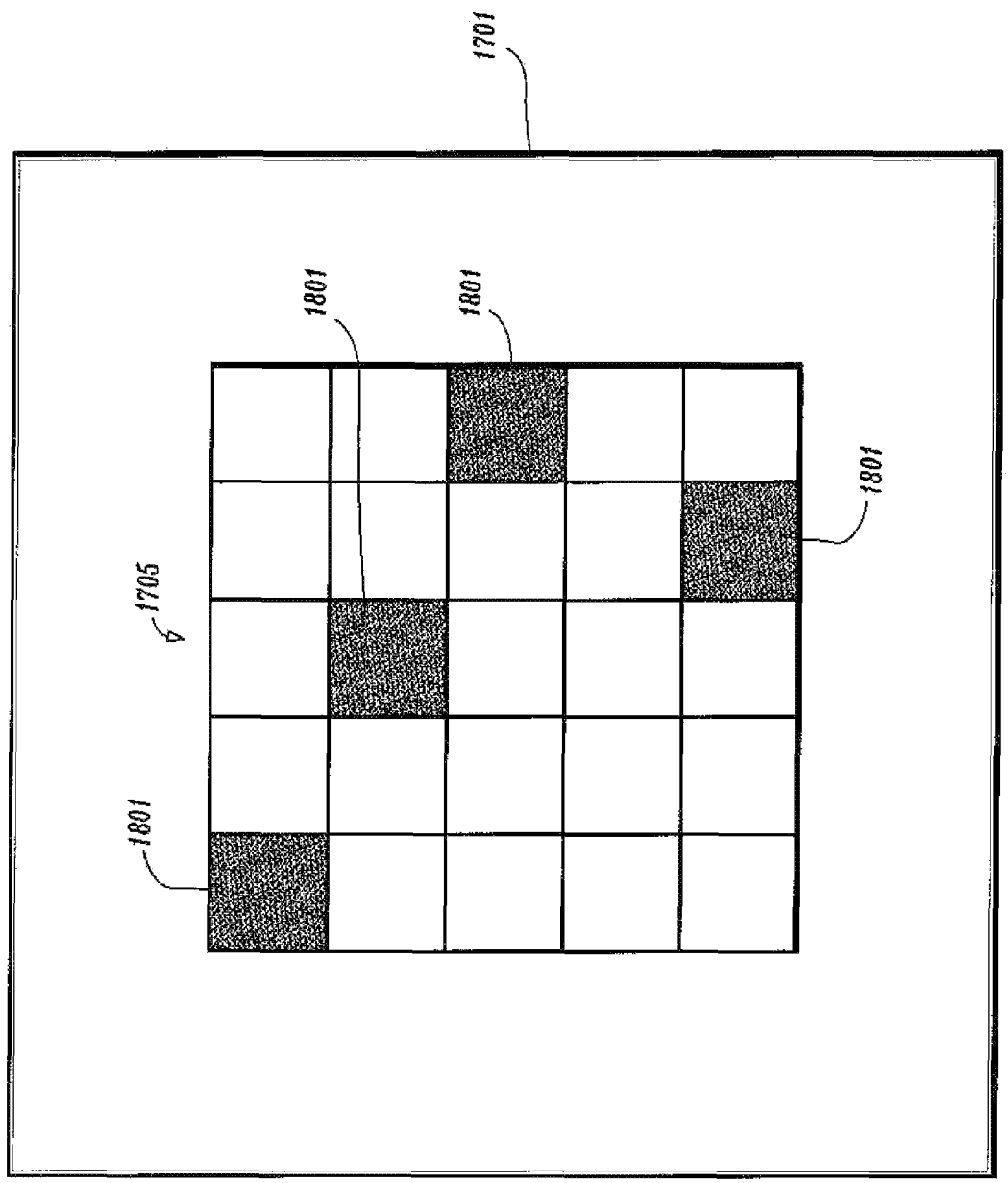
FIG. 18 is an exemplary illustration of step 1675 of FIG. 16 according to an aspect of the present invention.

FIG. 18 depicts an exemplary illustration of step 1675, in which the average intensities of all the blocks is converted into black or white intensities. For example, blocks 1701 from FIG. 17 were changed to black here (1801), from greyscale in FIG. 17, since their b_w_i was less than 50.

In one embodiment of the present invention, embedded devices can be devised in which existing radio frequency communication technology coexists with the communication system of the present invention. For example, an embedded device can use existing technology, e.g., spread spectrum, to make the initial contact with another embedded device, and when lack of occlusion has been determined between the embedded devices, they can then switch over to communication using visual images as described in the present invention. In another example, embedded devices may employ existing wireless communication technology when transmitting especially large amounts of data, but can then switch back to using the communication system of the present invention when transmitting smaller amounts of data. Advantageously, this reduces the overall amount of radiation a user is exposed to.

It is to be appreciated by those of ordinary skill in the art that the present invention may preferably employ mirrors to enable communication among embedded devices around occlusions or obstructions. In another embodiment of the present invention, embedded devices may transmit signals around moving obstructions, such as people walking around a room in the signal path of embedded devices.

In another embodiment of the present invention, an embedded device, for example a computer, can have both a signal transmitting device and a signal receiving device.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A communication system comprising:
    a signal transmitting device having
        a sending CPU and a sending memory;
        a generated signal template for generating a signal pattern to be transmitted;
        a signal display for displaying the signal pattern generated by said generated signal template;
        a signal display controller for controlling position and orientation of said signal display;
    a signal receiving device for communicating with said signal transmitting device having
        a receiving memory and a receiving CPU;
        a visual recording device for sensing the signal pattern of the signal display;
        an image for decoding the signal pattern; and
        a visual recording device controller for automatically controlling the orientation and zoom of said visual recording device, wherein communication between said signal transmitting device and said signal receiving device is established by the visual recording device detecting and decoding visual images displayed by the signal display.

2. The system of claim 1, wherein a plurality of mirrors are used to transmit signal patterns between a signal transmitting device and a signal receiving device having obstructions between them.

3. A signal transmitting device comprising:
    a sending CPU and a sending memory;
    a generated signal template for generating a signal pattern to be transmitted, wherein the signal pattern is a visual pattern of blobs;
    a signal display for displaying the signal pattern generated by said generated signal template; and
    a signal display controller for controlling a position and an orientation of said signal display relative to a signal receiving device, wherein the signal pattern displayed by the signal display is visible to the signal receiving device and the signal pattern is utilized to establish communication between the signal transmitting device and the signal receiving device.

4. The signal transmitting device of claim 3, wherein each blob is a plurality of adjoining pixels each having an identical pixel value, wherein a pixel value is selected from the group consisting of black and white.

5. A signal receiving device comprising:
    a receiving memory and a receiving CPU;
    a visual recording device for determining a signal pattern of a signal display, wherein the signal pattern is a visual pattern of blobs;
    an image decoder for decoding the signal pattern; and
    a visual recording device controller for automatically controlling the orientation and zoom of said visual recording device, wherein communication between a signal transmitting device comprising the signal display and the signal receiving device is established by the visual recording device detecting and decoding the signal pattern displayed by the signal display.

6. The signal receiving device of claim 5, wherein each blob is a plurality of adjoining pixels each having an identical pixel value, wherein a pixel value is selected from the group consisting of black and white.

7. The signal transmitting device of claim 3, wherein the displayed signal pattern is changeable in response to a request from the signal receiving device, wherein the request causes the signal pattern to change.

* * * * *